United States Patent

[11] 3,622,909

| [72] | Inventors | Brian Hanson Woodcock<br>St. Albans, England;<br>Walter Luck Faust, Los Angeles, Calif. |
|---|---|---|
| [21] | Appl. No. | 62,281 |
| [22] | Filed | Aug. 10, 1970 |
| [45] | Patented | Nov. 23, 1971 |
| [73] | Assignee | Union Carbide Corporation |

[54] METHOD AND MEANS FOR PROVIDING A HIGH-REPETITION RATE Q-SWITCHED GAS LASER
4 Claims, 4 Drawing Figs.

[52] U.S. Cl. .................................................. 331/94.5
[51] Int. Cl. .................................................. H01s 3/11
[50] Field of Search ...................................... 331/94.5

[56] References Cited
UNITED STATES PATENTS
| 3,465,358 | 9/1969 | Bridges ................... | 331/94.5 |
| 3,548,337 | 12/1970 | Gates et al. ............. | 331/94.5 |

*Primary Examiner*—Ronald L. Wibert
*Assistant Examiner*—Edward S. Bauer
*Attorney*—Pastoriza and Kelly ABSTRACT: A gas laser is Q-switched by rotating one of the end mirrors about an axis forming an acute angle with the axis of the resonator. By this arrangement, the pulse repetition rate of the gas laser may be increased considerably without decreasing the available dwell time for laser pulse generation.

PATENTED NOV 23 1971

3,622,909

INVENTORS:
BRIAN HANSON WOODCOCK
WALTER LUCK FAUST
BY
Pastoriza & Kelly
ATTORNEYS

METHOD AND MEANS FOR PROVIDING A HIGH-REPETITION RATE Q-SWITCHED GAS LASER

This invention relates to a method and means for enabling Q-switched gas lasers to be operated at high repetition rates.

BACKGROUND OF THE INVENTION

Continuous wave gas lasers such as the $CO_2$ laser operate efficiently and provide higher average power than is currently available from solid-state lasers. As a consequence, these continuous wave gas lasers are becoming increasingly utilized as industrial tools for such operations as micromachining. Unfortunately, the high reflectivity of some metals to the wave length of the radiation limits the utility of certain of these lasers. This problem can be avoided by operating the laser in a pulsed mode which provides a high instantaneous power sufficient to melt or vaporize the metal surface. Once this threshold has been reached, power is more easily absorbed and the reaction proceeds rapidly. The high instantaneous power levels are realized by Q-switching which enables the generation of giant pulses by providing periods between pulse generation for storage of energy in the laser medium. This energy is then released in a very short interval of time and the giant pulses can be repeated at frequent intervals to provide average powers close to the continuous wave level of operation. The peak powers in turn are from two to three orders of magnitude greater.

Gas lasers generally utilize end mirrors defining an optical cavity for the laser. A common method for Q-switching such lasers is to rotate one of the end mirrors of the optical cavity such that a pulse occurs only when the mirror surface comes into substantial alignment with the other stationary laser mirror defining the other end of the cavity. For high pulse repetition rates, the mirror must be spun very fast. As the speed is increased, there comes a point at which the time when the mirrors are in alignment is too short to allow the oscillation to build up to saturation. Unlike certain solid state lasers, gaseous lasers require a certain "dwell time" in which the mirrors are in substantial alignment in order that a usable output pulse can be generated. Thus, there exists a limit beyond which it is not useful to drive the mirror faster thereby fixing the maximum pulse repetition rate and the minimum period between pulses. This minimum period between pulses is substantially longer than the time required for useful energy accumulation in the gas. Thus, insofar as gas properties are concerned, the laser could be Q-switched more often if a satisfactory Q-switching device could be built.

The pulse repetition rate can still be increased by increasing the number of mirror surfaces on the rotating structure; for example by using a polygon in place of a single mirror. Polygons have been used with up to 24 facets but these are very expensive to produce and have high moments of inertia. The problem thus presents itself as to how to increase the pulse repetition rate and yet still maintain the necessary "dwell time" to provide usable output pulses from the gas laser.

BRIEF DESCRIPTION OF THE PRESENT INVENTION

The present invention comprehends a method and means for enabling a gas laser to be repetitively Q-switched at a very high rate without decreasing the dwell time below an acceptable minimum at which usable output pulses are provided.

In accord with the invention, rather than rotating one of the optical cavity end mirrors about an axis perpendicular to the resonator axis the end mirror is caused to rotate about an axis forming an acute angle with the resonator axis. The plane of the end mirror is made to form the compliment of the acute angle with the axis of rotation so that it will be in substantial alignment in at least one rotative position of the mirror.

With the foregoing arrangement, the dwell time or time during which the mirror is within a given small angle defining sufficient alignment so as to restore the Q of the cavity is inversely proportional to the sine of the acute angle between the axis of rotation and axis of the resonator. It will be appreciated accordingly, that the pulse repetition rate may be increased by one order of magnitude over the highest pulse repetition rate possible, consistent with a minimum dwell time when the mirror is rotated about an axis normal to the resonator axis by simply making the sine of the acute angle in the neighborhood of 0.1.

For a given acute angle and speed of rotation, a given dwell time is defined. By then using a multifaceted prism, the pulse repetition rate is made proportional to the number of facets.

BRIEF DESCRIPTION OF THE DRAWINGS

A better understanding of the invention will be had by referring to one embodiment thereof as illustrated in the accompanying drawings, in which.

DETAILED DESCRIPTION OF THE PREFERRED EMBODIMENT

Figure 1:
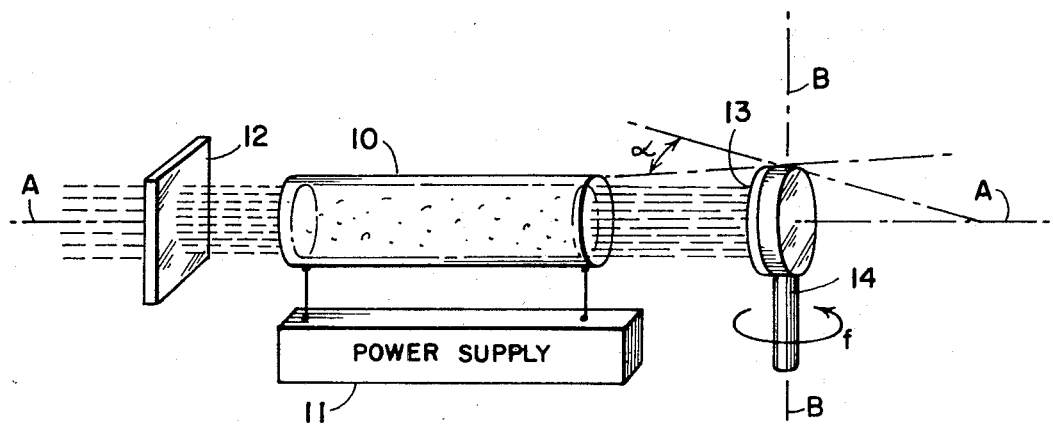
FIG. 1 is a schematic showing of a gas laser such as a $CO_2$ laser with a conventional type of Q-spoiling means for providing pulsed operation.

Referring to FIG. 1, there is shown diagrammatically a typical gas laser 10 and associated power supply 11 providing a high voltage source for the gas discharge. The laser itself may take the form of an elongated cylindrical glass tube filled with the gaseous laser medium such as $CO_2$–$N_2$–He mixture.

End mirrors 12 and 13 define an optical cavity resonator for the stimulated emission of radiation from the gaseous medium. The end mirror 12 may be made partially transmissive in order to couple radiation out of the system. The axis A—A represents the axis of radiation coinciding with the alignment axis of the optical cavity between the mirrors 12 and 13.

As indicated in FIG. 1, in order to Q-switch the laser system thereby providing for the generation of giant pulses rather than have the laser operate in a continuous mode, the end mirror 13 is mechanically rotated about an axis B—B by rotating the shaft 14. In conventional arrangements this shaft 14 forms a right angle or 90° angle with the axis A—A of the resonator.

As also indicated in FIG. 1, there is a small angle $\alpha$ through which the mirror 13 passes. When this mirror lies within the angle $\alpha$, the Q of the cavity is sufficiently restored to provide a usable output pulse. The duration of time that the mirror is within the tolerance angle $\alpha$ is herein termed the "dwell time." Provided that mirror 13 has only one facet, then the rate of rotation determines the pulse repetition rate.

With the foregoing arrangement, it will be evident that increasing the revolutions per minute of the mirror proportionately decreases the "dwell time" of the mirror. Thus the pulse repetition rate is limited by that dwell time necessary to generate a useful output pulse. Any attempt to increase the pulse repetition rate as by increasing the rate of rotation of the mirror will decrease the dwell time below the minimum required.

In order to overcome the foregoing problem, the present invention contemplates mounting the end mirror 13 on a shaft 15 for rotation about an axis B'—B' forming an angle $\theta$ with the radiation axis A—A. With this arrangement and the plane of the mirror positioned to be normal to the axis A—A in at least one rotative position so that it forms the complementary angle with the acute angle, the dwell time will be increased over that for the situation in FIG. 1 assuming that the rate of rotation is the same. This increased dwell time occurs because the rate of sweep depends upon the components of angular velocity perpendicular to the resonator axis which is proportional to the sine of the acute angle $\theta$.

As a specific example, if the angle θ is made 30° so that its sine is 0.5, the rate of rotation about the axis B'—B' may be doubled that about the axis B—B of FIG. 1 without changing the dwell time. The arrangement thus enables the pulse repetition rate to be doubled for a gas laser and it will evident that for smaller angles of θ, the pulse repetition rate may be increased by a considerably greater amount.

Figure 3:
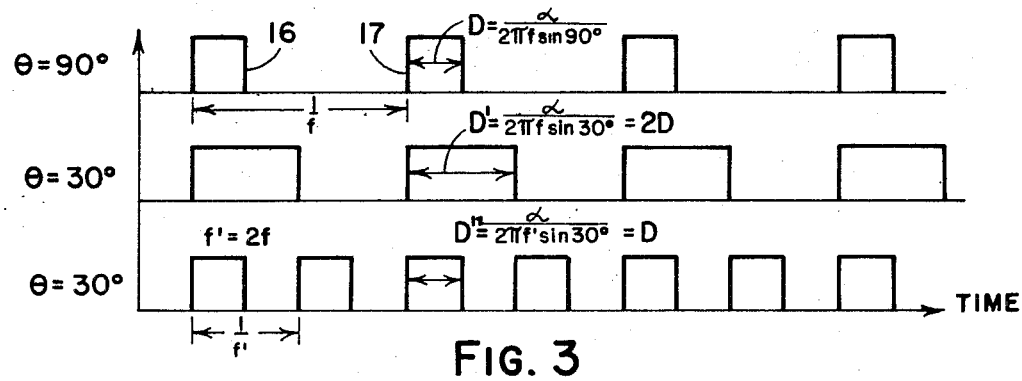
FIG. 3 illustrates a series of timing wave forms useful in explaining the operation of the invention; and, FIG. 4 is a perspective view of a multifaceted end mirror in accord with the invention, the particular example showing four facets.

The foregoing will be better understood by referring to FIG. 3 wherein the top series of waveforms such as 16 and 17 represent the dwell time that the mirror is traveling through the angle α shown in FIG. 1. In other words, when the mirror is positioned within the limits of this angle, it is sufficiently aligned with the end mirror 12 of FIG. 1 to restore the Q of the optical cavity and permit generation of a giant pulse of radiation.

As indicated in the top waveform of FIG. 3, this dwell time D is indicated by the formula wherein the mirror is rotated about the axis B—B at right angles or 90° to the axis A—A at a frequency of $f$. The second waveform of FIG. 3 illustrates the increased dwell time for the same rotational frequency $f$ when the shaft 15 or axis of rotation B'—B' is disposed at an angle of 30° with respect to the radiation axis A—A. The new dwell time D' is given by the formula shown and is equal to twice the dwell time D which occurs in the upper wave forms.

Figure 2:
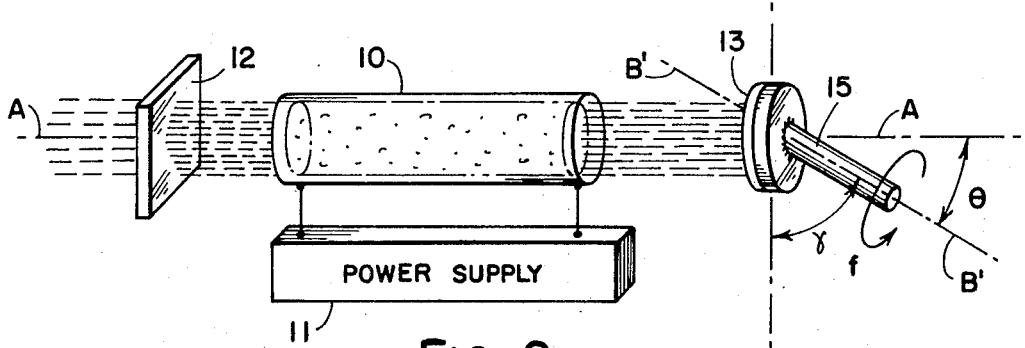
FIG. 2 illustrates the laser system of FIG. 1 modified in accord with the present invention to enable a greatly increased Q-switching rate to be achieved with only one facet.

The third or bottom series of waveforms in FIG. 3 illustrates the dwell time D" when the pulse repetition rate or rotational rate of the shaft 15 of FIG. 2 is doubled. It will be noted that this new dwell time D" is equal to the original dwell time D and if this original dwell time is deemed the minimum necessary to provide useful output pulses it will be evident that such pulses are provided at twice the repetition rate as was possible with the embodiment of FIG. 1. This new pulse repetition frequency is represented by $f'$ which is equal to $2f$.

Figure 4:
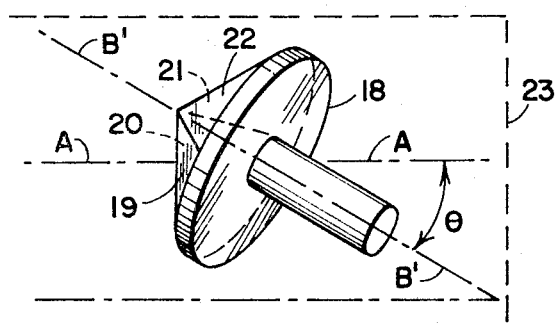

Referring now to FIG. 4 there is shown a practical embodiment of an end mirror designated 18 which might be used in practicing the invention. As shown, this structure includes a plurality of mirror surfaces or facets 19, 20, 21, and 22 defining a pyramid. The arrangement is such that if the axis B'—B' of the rotational axis for the mirror forms an angle θ with the radiation axis A—A the apex angle of each facet with respect to this axis of rotation defines the complimentary angle or 90-θ. By providing four such facets, it will be evident that the revolutions per minute of the mirror to provide the repetition frequency $f'$ described in the third set of waveforms in FIG. 3 may be made one-fourth the value $f'$. Additional facets such as eight may be provided to further decrease the necessary revolutions per minute for a given pulse repetition rate.

While the angle θ in FIG. 4 has been shown fairly large and the angles of the facets of the mirrors with the axis exaggerated, in an actual embodiment, the angle θ might be of the order of 6° which would provide approximately a tenfold increase in the repetition rate for the same dwell time as could be realized were the axis of rotation at 90° to the radiation axis. With a suitably small angle, the shape of the mirror is almost a disc which may mechanically be rotated at a very high speed. Further, it is feasible in accord with the invention to mount the mirror for rotation within the gaseous medium itself. This disc position is indicated by the dash line 23 representing the glass tube holding the gaseous laser medium surrounding the mirror 18. The gas mixture itself in the case of the $CO_2$ laser is predominately helium at a pressure of 10 to 20 torr. This environment is highly suitable for a high speed rotary device since the helium introduces less drag than air, less effect of turbulence on the optical cavity, and, has better thermal conductivity.

Rotating the mirror of FIG. 4 at 120,000 r.p.m. will provide a repetition rate of 8,000 pulses per second at which value most of the available energy in the gaseous medium is extracted. Alternatively, the same result can be obtained with an eight-sided pyramid rotated at 60,000 r.p.m.

OPERATION

The operation of the gas laser will be evident from the above description. As stated, the mirror is preferably mounted within the gaseous enclosure and rotated at a desired r.p.m. depending upon the desired number of pulses per second to be generated. The angle θ that the rotating shaft forms with the resonator axis A—A is chosen to assure sufficient dwell time for the selected r.p.m.

As the face of the mirror or facet moves through the angle α wherein it is in substantial alignment with the end mirror forming the other end of the optical cavity, the Q of the cavity is restored and a useful output pulse is generated. At all other positions of the mirror, the Q of the cavity is spoiled so that no output pulse is generated.

From the foregoing description, it will thus be evident that the present invention has provided a practical method and means for enabling a greatly increased switching rate of gas lasers to be realized without sacrificing the dwell time necessary to produce useful output pulses of radiant energy.

What is claimed is:

1. A method of Q-switching a gas laser at a given high repetition rate wherein generation of a useful output pulse requires at least a given dwell time during which the Q of the optical cavity defined between end mirrors is restored, comprising the steps of:
    a. orienting the plane of one end mirror defining said optical cavity normal to the resonator axis of the laser; and
    b. rotating said end mirror about an axis forming an acute angle with said resonator axis, said angle being defined by $\sin^{-1} f/f'$ where $f$ is the pulse repetition frequency necessary to provide said given dwell time when said angle is 90° and $f'$ is said given high repetition rate.

2. A high repetition rate gas laser including:
    a. a gaseous laser material;
    b. power supply means for said material;
    c. end mirrors defining an optical cavity resonator for said laser material; and
    d. means for moving one of said end mirrors into and out of alignment to restore and spoil the Q of said optical cavity resonator respectively at a given repetition rate, said means including a mounting for rotating said one of said end mirrors about an axis forming an acute angle with respect to the resonator axis of said optical cavity, the plane of the mirror being normal to said resonator axis of said optical cavity, the plane of the mirror being normal to said resonator axis in at least one rotative position of said mounting so as to form the complimentary angle of said acute angle with the axis of rotation of said mirror.

3. A laser according to claim 2, in which said one of said end mirrors includes a plurality of facets defining a pyramid; a shaft coaxial with the axis of rotation of the mirror extending normally from an under central portion of the base of said pyramid, the apex angle of each facet with respect to the axis of rotation defining said complementary angle.

4. A laser according to claim 3, in which said one of said end mirrors is mounted for rotation within said gaseous laser material.

* * * * *